US012500994B2

(12) United States Patent
Wang et al.

(10) Patent No.: US 12,500,994 B2
(45) Date of Patent: Dec. 16, 2025

(54) METHOD FOR RECORDING VIDEO CONFERENCE AND VIDEO CONFERENCING SYSTEM

(71) Applicant: Merry Electronics(Shenzhen) Co., Ltd., ShenZhen (CN)

(72) Inventors: Shuo-Yu Wang, Taichung (TW); Chan-An Wang, Taichung (TW); Hsiu-Ling Lin, Taichung (TW); Chung-Yi Huang, Taichung (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 161 days.

(21) Appl. No.: 18/536,059

(22) Filed: Dec. 11, 2023

(65) Prior Publication Data

US 2025/0150550 A1  May 8, 2025

(30) Foreign Application Priority Data

Nov. 8, 2023  (TW) ................. 112143049

(51) Int. Cl.
| | |
|---|---|
| *H04N 5/91* | (2006.01) |
| *G06F 3/0484* | (2022.01) |
| *G06T 7/70* | (2017.01) |
| *G06V 40/10* | (2022.01) |
| *G10L 17/02* | (2013.01) |
| *G10L 17/14* | (2013.01) |
| *G11B 27/34* | (2006.01) |

(52) U.S. Cl.
CPC ............ *H04N 5/91* (2013.01); *G06F 3/0484* (2013.01); *G06T 7/70* (2017.01); *G06V 40/10* (2022.01); *G10L 17/02* (2013.01); *G10L 17/14* (2013.01); *G11B 27/34* (2013.01); *G06T 2207/10016* (2013.01); *G06T 2207/30196* (2013.01)

(58) Field of Classification Search
CPC .. H04N 5/91; G06T 7/70; G06V 40/10; G06F 3/0484; G10L 17/02; G10L 17/14; G11B 27/34
See application file for complete search history.

(56) References Cited

U.S. PATENT DOCUMENTS

| | | | | |
|---|---|---|---|---|
| 8,351,581 | B2* | 1/2013 | Mikan | H04M 3/42221 |
| | | | | 379/88.14 |
| 9,443,518 | B1* | 9/2016 | Gauci | G06F 40/169 |
| 10,798,341 | B1* | 10/2020 | Hegde | H04N 21/8549 |
| 10,965,909 | B2* | 3/2021 | Tanaka | H04M 3/563 |

(Continued)

*Primary Examiner* — Olisa Anwah
(74) *Attorney, Agent, or Firm* — JCIPRNET

(57) ABSTRACT

A method for recording a video conference and a video conferencing system are provided. The method includes: providing a user interface to a display device, in which the user interface includes a first area, a second area, and a timeline; in response to obtaining an image corresponding to each of multiple participants from a video signal through a person recognition algorithm, displaying the image of each participant in the first area; in response to converting an audio segment of one of the participants obtained from an audio signal into text content through a voice processing algorithm, associating the text content with the corresponding one of the participants, and based on an order of speaking, displaying the text content in the second area; and adjusting a time length of the timeline according to a recording time of the video conference.

12 Claims, 3 Drawing Sheets

(56) References Cited

U.S. PATENT DOCUMENTS

| | | | |
|---|---|---|---|
| 11,315,569 B1* | 4/2022 | Talieh | H04L 12/1831 |
| 2012/0053936 A1* | 3/2012 | Marvit | H04N 7/147 |
| | | | 348/E7.083 |
| 2022/0254348 A1* | 8/2022 | Tay | G06F 16/345 |
| 2023/0208664 A1* | 6/2023 | Mese | H04N 7/15 |
| | | | 709/204 |
| 2023/0419966 A1* | 12/2023 | Roper | G06F 40/274 |
| 2024/0163390 A1* | 5/2024 | Hutto | H04N 5/2628 |
| 2025/0005289 A1* | 1/2025 | Wang | G06F 16/345 |
| 2025/0039335 A1* | 1/2025 | Jain | H04N 7/15 |
| 2025/0140246 A1* | 5/2025 | Lee | H04L 65/1089 |

* cited by examiner

METHOD FOR RECORDING VIDEO CONFERENCE AND VIDEO CONFERENCING SYSTEM

CROSS-REFERENCE TO RELATED APPLICATION

This application claims the priority benefit of Taiwan application serial no. 112143049, filed on Nov. 8, 2023. The entirety of the above-mentioned patent application is hereby incorporated by reference herein and made a part of this specification.

BACKGROUND

Technical Field

The disclosure relates to a video conferencing system and a method of using the same, and particularly relates to a method for recording a video conference and a video conferencing system thereof.

Description of Related Art

With the development of the Internet, the usage of online conferencing software has increased significantly, which allows people to hold video conferences with other users remotely without actually traveling around. In order to avoid forgetting the content discussed after the video conferences, it is generally required to prepare verbatim transcripts by manual input, which is quite time-consuming. Besides, it may not be easy to identify the speakers from the verbatim transcripts, and sometimes it is not possible to determine the participant who made certain speeches during subsequent viewing.

SUMMARY

The disclosure provides a method for recording a video conference and a video conferencing system thereof, which automatically convert the voices of different speakers into text content for recording.

A method for recording a video conference according to an embodiment of the disclosure is performed by a processor in response to the video conference being started. The method includes: providing a user interface to a display device, in which the user interface includes a first area, a second area, and a timeline; in response to obtaining an image corresponding to each of a plurality of participants from a video signal through a person recognition algorithm, displaying the image of each of the participants in the first area; in response to converting an audio segment of one of the participants obtained from an audio signal into text content through a voice processing algorithm, associating the text content with the corresponding one of the participants, and displaying the text content in the second area based on an order of speaking; and adjusting a time length of the timeline according to a recording time of the video conference.

In an embodiment of the disclosure, the first area provides an editing function, and after displaying the image of each of the participants in the first area, the method further includes: renaming a name corresponding to the image through the editing function.

In an embodiment of the disclosure, the method performed by the processor in response to the video conference being started further includes: identifying each of the participants included in the video signal through the person recognition algorithm, and obtaining a relative position of each of the participants in a conference space; extracting a voice from the audio signal through a voiceprint recognition module; determining a source position of the voice in the conference space through a sound source positioning algorithm; matching the voice with the corresponding one of the participants based on the relative position and the source position; and converting the audio segment corresponding to the voice into the text content through the voice processing algorithm.

In an embodiment of the disclosure, displaying the text content in the second area includes: extracting from the first area the image of one of the participants that matches the voice and a name corresponding thereto after converting the audio segment corresponding to the voice into the text content through the voice processing algorithm; and displaying the image, the name, the text content, and a reception time of the audio segment in the second area.

In an embodiment of the disclosure, after converting the audio segment corresponding to the voice into the text content through the voice processing algorithm, the method further includes: associating a time section corresponding to the audio segment on the timeline with the text content.

In an embodiment of the disclosure, the user interface provides a marking function. The method further includes: based on a time point when the marking function is enabled, putting a focus mark on the text content corresponding to the time point in the second area.

In an embodiment of the disclosure, the text content presented in the second area has a playback function. The method further includes: playing the audio segment corresponding to the text content in response to the playback function being enabled.

A video conferencing system according to an embodiment of the disclosure includes: a display device; a storage including an application program; and a processor coupled to the display device and the storage, and configured to execute the application program to start a video conference, and in response to the video conference being started, the processor is configured to: provide a user interface to the display device, in which the user interface includes a first area, a second area, and a timeline; in response to obtaining an image corresponding to each of a plurality of participants from a video signal through a person recognition algorithm, display the image of each of the participants in the first area; in response to converting an audio segment of one of the participants obtained from an audio signal into text content through a voice processing algorithm, associate the text content with the corresponding one of the participants, and display the text content in the second area based on an order of speaking; and adjust a time length of the timeline according to a recording time of the video conference.

Based on the above, the disclosure is capable of instantly identifying the source of a voice, converting the voice into text content, associating the text content with the speaker, and presenting the recognition result through the user interface, thereby providing complete meeting records for the user's reference.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Figure 1:
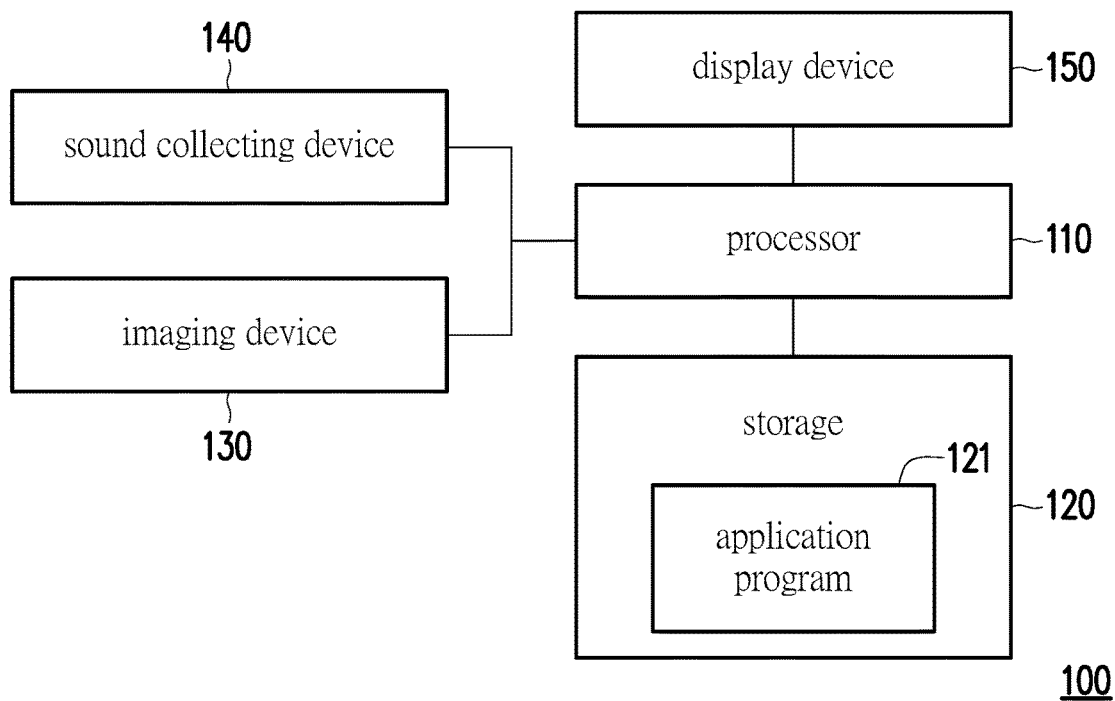
FIG. 1 is a block diagram of a video conferencing system according to an embodiment of the disclosure.

FIG. 1 is a block diagram of a video conferencing system according to an embodiment of the disclosure. Referring to FIG. 1, the video conferencing system 100 includes a processor 110, a storage 120, an imaging device 130, a sound collecting device 140, and a display device 150. The processor 110 is coupled to the storage 120, the imaging device 130, the sound collecting device 140, and the display device 150.

The processor 110 is, for example, a central processing unit (CPU), a physics processing unit (PPU), a programmable microprocessor, an embedded control chip, a digital signal processor (DSP), an application specific integrated circuit (ASIC), or other similar devices.

The storage 120 is, for example, any type of fixed or removable random access memory (RAM), read-only memory (ROM), flash memory, hard disk, other similar devices, or a combination of these devices. The storage 120 stores one or more program code snippets to be executed by the processor 110 after being installed. In this embodiment, the storage 120 includes an application program 121 for executing a video conference. The processor 110 is configured to perform a method for recording a video conference, as described below, in response to the video conference being started.

The imaging device 130 may be a video recorder or a camera that uses a charge coupled device (CCD) lens, a complementary metal oxide semiconductor transistor (CMOS) lens, etc. For example, the imaging device 130 may use a wide-angle camera, a half-celestial camera, a full-celestial camera, etc.

The sound collecting device 140 is, for example, a microphone. In an embodiment, only one sound collecting device 140 may be provided. In other embodiments, multiple sound collecting devices 140 may be provided.

The display device 150 is configured to present a user interface. For example, the display device 150 may be implemented using a liquid crystal display (LCD), a plasma display, a projection system, etc.

Figure 2:
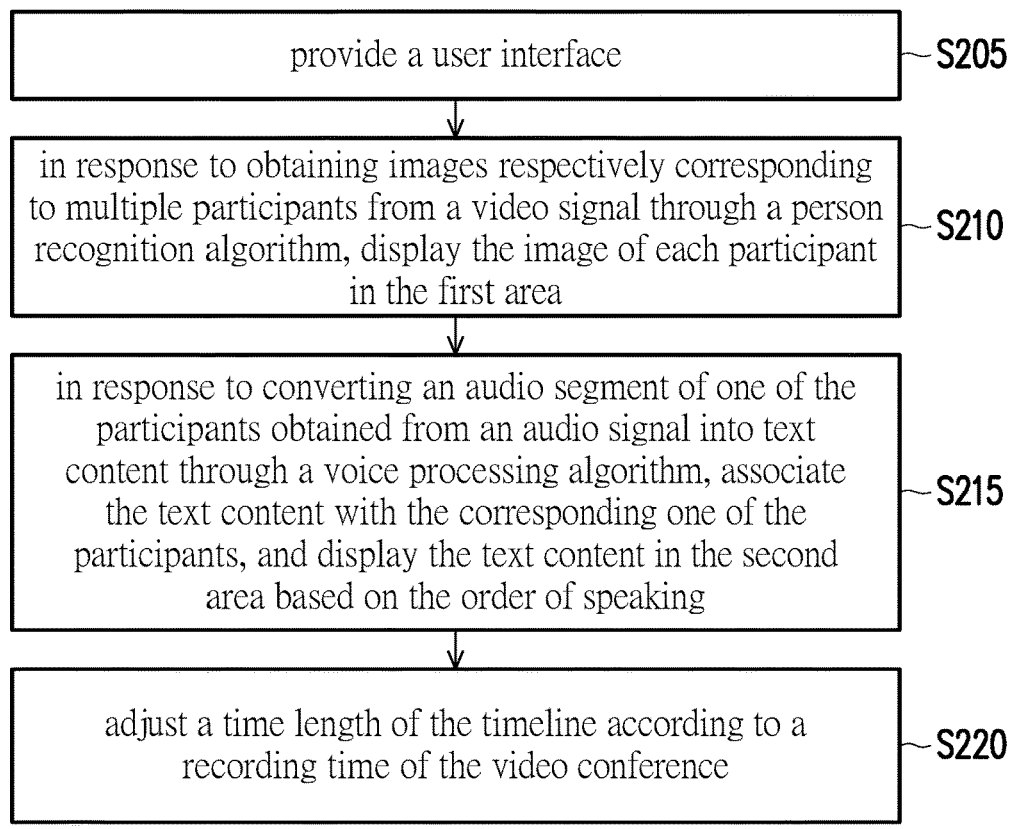
FIG. 2 is a flowchart of a method for recording a video conference according to an embodiment of the disclosure.

FIG. 2 is a flowchart of a method for recording a video conference according to an embodiment of the disclosure. Referring to FIG. 1 and FIG. 2, in this embodiment, the processor 110 executes the application program 121 to start a video conference. As the application program 121 is started, the processor 110 drives the imaging device 130 and the sound collecting device 140 to obtain video signals and audio signals respectively. Besides, when the video conference is started, the following steps S205 to S220 are executed by the processor 110.

In step S205, a user interface is provided to the display device 150. The user interface includes a first area, a second area, and a timeline. In step S210, in response to obtaining images respectively corresponding to multiple participants from a video signal through a person recognition algorithm, the image of each participant is displayed in the first area. The first area is configured to display speaker information in the video conference. For example, the image of each participant is extracted from one or more image frames included in the video signal through the person recognition algorithm, and displayed in the first area of the user interface.

In step S215, in response to converting an audio segment of one of the participants obtained from an audio signal into text content through a voice processing algorithm, the text content is associated with the corresponding one of the participants, and the text content is displayed in the second area based on the order of speaking. The voice processing algorithm is, for example, a voice-to-text algorithm. For example, the processor 110 extracts an audio segment of the same speaker within a continuous period of time to perform voice-to-text processing. The second area is configured to record the text content of the speech in the conference video and display multiple speeches according to the order of speaking.

Further, in step S220, a time length of the timeline is adjusted according to a recording time of the video conference. In addition, the processor 110 associates the recognized text content and the corresponding audio segment with the corresponding participant and then stores the same.

Figure 3:
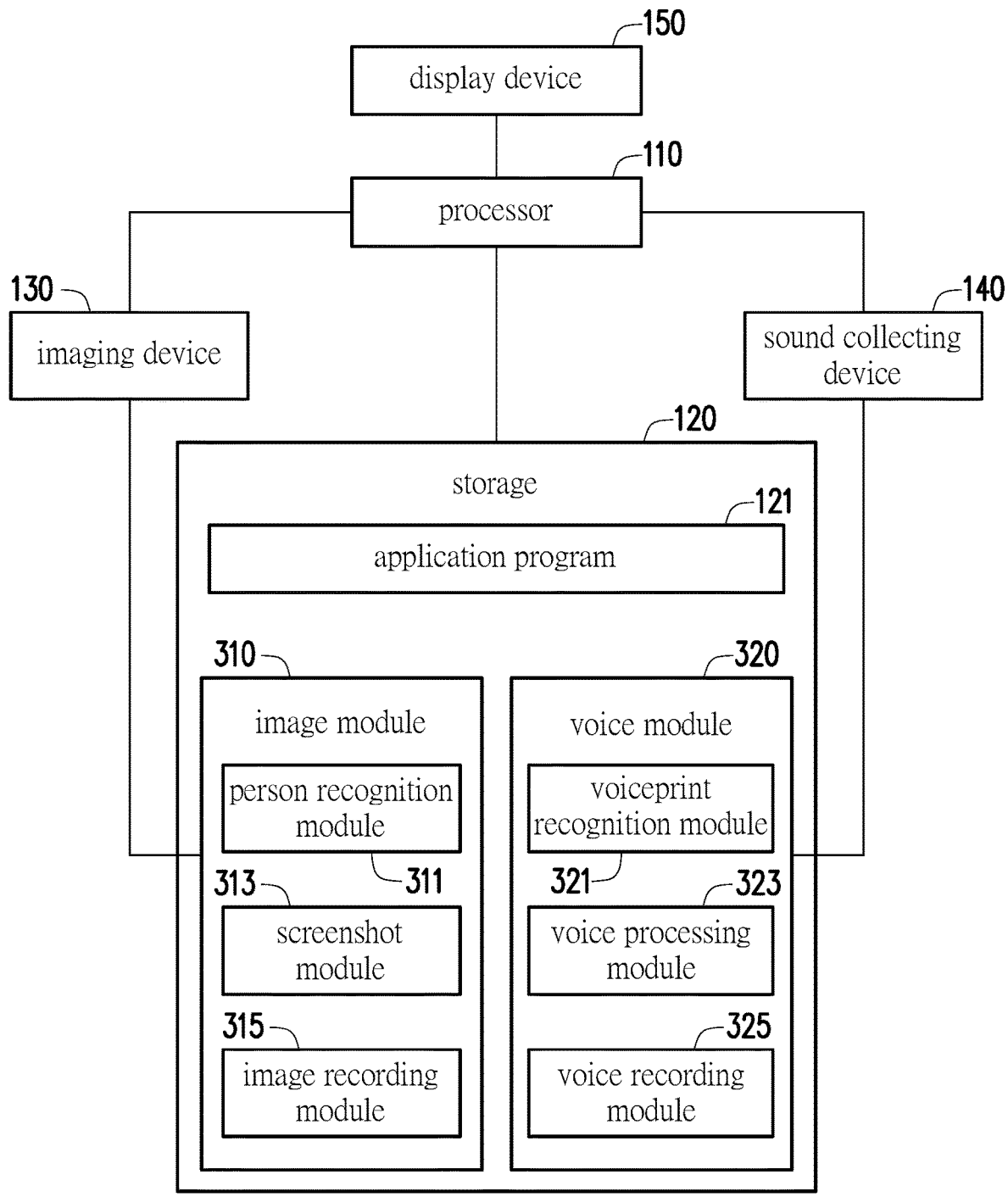
FIG. 3 is a block diagram of an application example of the video conferencing system according to an embodiment of the disclosure.

Details of an application example of a video conferencing system 100 will be described below with reference to an exemplary embodiment. FIG. 3 is a block diagram of an application example of the video conferencing system according to an embodiment of the disclosure. FIG. 3 shows an application example of FIG. 1. The storage 120 further includes an image module 310 and a voice module 320. In this embodiment, the image module 310 and the voice module 320 are software modules configured independently of the application program 121. However, the disclosure is not limited thereto, and in other embodiments, the image module 310 and the voice module 320 may also be integrated inside the application program 121.

The image module 310 includes a person recognition module 311, a screenshot module 313, and an image recording module 315. The person recognition module 311 is configured to identify the multiple participants in the video signal. The screenshot module 313 is configured to take a screenshot of each of the participants in the video signal to obtain the image corresponding to each participant. The image recording module 315 is configured to record the entire video file of the conference video, and also record a video segment corresponding to the speech made by each participant in real time.

The voice module 320 includes a voiceprint recognition module 321, a voice processing module 323, and a voice recording module 325. The voiceprint recognition module 321 is configured to identify a source position of a speaker. The voice processing module 323 is configured to convert an audio segment into text content. The voice recording module 325 is configured to record the audio segment and the text content corresponding to the speech of each participant in real time.

Specifically, as the application program 121 is started, the imaging device 130 and the sound collecting device 140 are driven to obtain the video signal and the audio signal respectively, so that the video signal obtained by the imaging device 130 is processed through the image module 310, and the audio signal obtained by the sound collecting device 140 is processed through the voice module 320.

After receiving the video signal and the audio signal, the image of the participant and the corresponding voice of the participant may be matched through the person recognition module 311 and the voiceprint recognition module 321. Specifically, the person recognition module 311 executes the person recognition algorithm to identify each participant included in the video signal and obtain a relative position of each participant in a conference space. For example, the person recognition module 311 may identify each image frame of the video conference and find immovable objects such as furniture or furnishings in the conference space, thereby determining the relative position of each participant in the conference space. Alternatively, the person recognition module 311 may determine the relative positions of movable objects, thereby determining the relative position of each participant in the conference space. Furthermore, the voiceprint recognition module 321 separates the voices belonging to different participants from the audio signal, and records the voiceprint corresponding to each voice. The voiceprint recognition module 321 further executes a sound source positioning algorithm to determine the source position of each voice in the conference space.

The processor 110 matches each voice with the image of the corresponding one of the participants based on each relative position obtained by the person recognition module 311 and each source position obtained by the voiceprint recognition module 321. Here, since not every participant may speak within the corresponding sound collecting time, the number of voices in the audio signal may be smaller than the number of participants in the video signal. Accordingly, the processor 110 performs the matching on the extracted voices and the images of the participants. In addition, the voiceprint of the identified voice is recorded. Therefore, if the voiceprint of the voice identified in a subsequently received audio signal has been recorded, the processor 110 is able to directly determine the participant corresponding to the voice based on the previous matching and is not required to perform matching between the voice and the participant again.

After matching the current voice with the corresponding participant, the voice processing module 323 executes the voice processing algorithm to convert the audio segment corresponding to the voice into text content, and displays the text content in the user interface accordingly.

Figure 4:
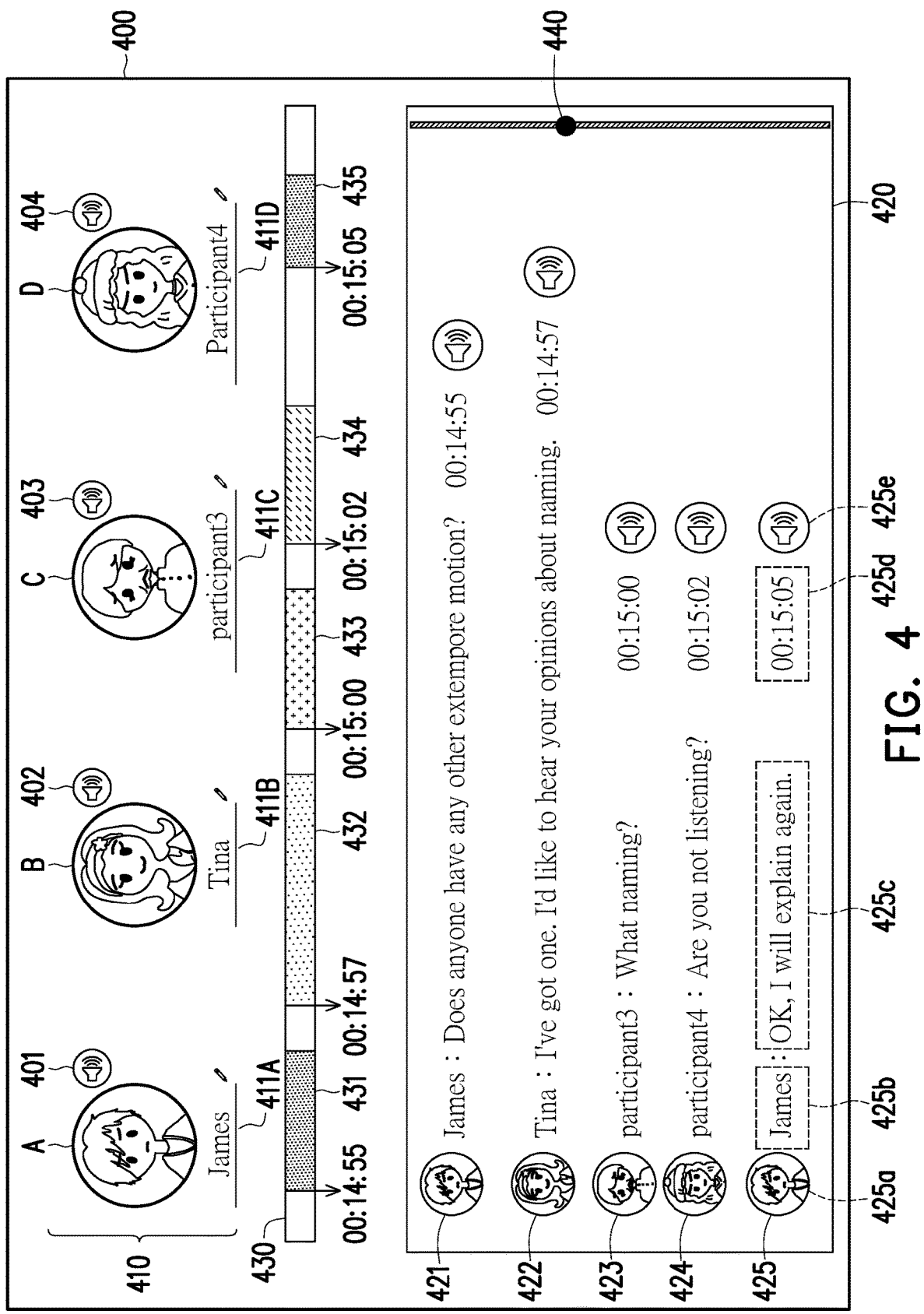
FIG. 4 is a schematic diagram of a user interface according to an embodiment of the disclosure.

FIG. 4 is a schematic diagram of a user interface according to an embodiment of the disclosure. Referring to FIG. 4, the user interface 400 includes a first area 410, a second area 420, and a timeline 430.

The first area 410 is configured to present the image obtained by the screenshot module 313. That is, after the person recognition module 311 identifies each participant in the video signal, the screenshot module 313 takes a screenshot of each participant in the video signal to obtain the image corresponding to each participant, and display the image in the first area 410 of the user interface 400.

In this embodiment, the first area 410 includes images A to D of four participants, and the images A to D respectively have corresponding name fields 411A to 411D. The name fields 411A to 411D are configured to display the corresponding name of each participant. In an embodiment, after the screenshot module 313 obtains the images A to D of the participants, preset names may be directly displayed in the name fields 411A to 411D. In addition, the first area 410 may also provide an editing function for renaming the names corresponding to the images A to D. For example, the name fields 411A to 411D respectively have editing functions, allowing the user to directly enter the names to be displayed in the name fields 411A to 411D.

Furthermore, the images A to D in the first area 410 also have corresponding play buttons 401 to 404 respectively. In an embodiment, after one or more voices are identified by the voiceprint recognition module 321 and each voice is matched with the corresponding participant, an audio segment in which the voice of each participant can be clearly identified is automatically extracted and associated with the corresponding one of the play buttons 401 to 404. In response to one of the play buttons 401 to 404 being enabled, the audio segment of the voice of the corresponding participant is played.

The second area 420 is configured to present multiple pieces of speech data 421 to 425. The second area 420 also includes a scroll bar 440, allowing the content displayed in the second area 420 to scroll up and down along the vertical direction. Specifically, after the voice processing module 323 converts the audio segment corresponding to the voice extracted from the audio signal into text content through the voice processing algorithm, the processor 110 extracts from the first area 410 the image of the participant that matches the voice and the corresponding name. Then, the processor 110 displays the obtained image, name, text content, and a reception time of the audio segment as one piece of speech data in the second area 420. Taking the speech data 425 as an example, the speech data 425 is the speech data of the participant corresponding to the image A. The speech data 425 includes a thumbnail 425a corresponding to the image A, a name 425b corresponding to the name field 411A, text content 425c of the speech, and a reception time 425d of the audio segment (that is, the speech time). Accordingly, the speech data 421 to 424 have the same configuration.

Each piece of speech data is also provided with a playback function. In response to the playback function being enabled, the audio segment corresponding to the text content is played. Taking the speech data 425 as an example, a play button 425e is provided corresponding thereto. The play button 425e is associated with the audio segment corresponding to the text content 425c. In response to the play button 425e being enabled, the processor 110 plays the audio segment corresponding to the text content 425c through a speaker. Accordingly, the speech data 421 to 424 have the same configuration.

The timeline 430 includes time sections 431 to 435, which respectively correspond to the speech data 421 to 425. Specifically, after converting the audio segment corresponding to the voice into text content, the processor 110 may further associate the time sections 431 to 435 corresponding to the audio segment in the timeline 430 with the text content. Accordingly, the corresponding speech data is selected by selecting the time sections 431 to 435 on the timeline 430, or the corresponding time section on the timeline 430 is selected by selecting among the speech data 421 to 425. Taking the speech data 425 as an example, the text content 425c is associated with the time section 435. Accordingly, the speech data 421 to 424 have the same configuration.

In addition, after obtaining the images A to D corresponding to the participants, the processor 110 may further store the images A to D in a database, and associate the video segment, audio segment, and text content of subsequent speeches of each participant with the image thereof for recording. The video segment, audio segment, and text content may be stored in different databases or in the same database.

Furthermore, the user interface 400 may further provide a marking function. Based on a time point when the marking function is enabled, the processor 110 puts a focus mark on the text content corresponding to the time point in the second area 420. For example, a function button is set in the user interface, and it is assumed that the time point when the function button is enabled is 15:05, and the processor 110 puts a focus mark on the text content 425*c*, for example, by marking the text content 425*c* with a color different from other text colors or visually presenting the text content 425*c* with highlight or fluorescent marking. Alternatively, the marking function may be enabled by setting a shortcut key in a remote control.

To sum up, the disclosure is capable of instantly identifying the source of a voice, associating the text content converted from the audio segment with the speaker, and providing a user interface to present records of the meeting. The user interface is configured to present the image of the speaker and the corresponding audio segment in association with each other. Through the above implementation, there is no need to re-create a participant database every time a video conference is started, and the recording and generation of meeting records may be started instantly.

What is claimed is:

1. A method for recording a video conference, performed by a processor in response to the video conference being started, the method comprising:
    providing a user interface to a display device, wherein the user interface comprises a first area, a second area, and a timeline;
    in response to obtaining an image corresponding to each of a plurality of participants from a video signal through a person recognition algorithm, displaying the image of each of the participants in the first area;
    in response to converting an audio segment of one of the participants obtained from an audio signal into text content through a voice processing algorithm, associating the text content with the corresponding one of the participants, and displaying the text content in the second area based on an order of speaking; and
    adjusting a time length of the timeline according to a recording time of the video conference,
    wherein the method performed by the processor in response to the video conference being started further comprises:
        identifying each of the participants included in the video signal through the person recognition algorithm, and obtaining a relative position of each of the participants in a conference space;
        extracting a voice from the audio signal through a voiceprint recognition module;
        determining a source position of the voice in the conference space through a sound source positioning algorithm;
        matching the voice with the corresponding one of the participants based on the relative position and the source position; and
        converting the audio segment corresponding to the voice into the text content through the voice processing algorithm.

2. The method for recording the video conference according to claim 1, wherein the first area provides an editing function, and after displaying the image of each of the participants in the first area, the method further comprises:
    renaming a name corresponding to the image through the editing function.

3. The method for recording the video conference according to claim 1, wherein displaying the text content in the second area comprises:
    extracting from the first area the image of one of the participants that matches the voice and a name corresponding thereto after converting the audio segment corresponding to the voice into the text content through the voice processing algorithm; and
    displaying the image, the name, the text content, and a reception time of the audio segment in the second area.

4. The method for recording the video conference according to claim 3, wherein after converting the audio segment corresponding to the voice into the text content through the voice processing algorithm, the method further comprises:
    associating a time section corresponding to the audio segment on the timeline with the text content.

5. The method for recording the video conference according to claim 1, wherein the user interface provides a marking function, and the method further comprises:
    based on a time point when the marking function is enabled, putting a focus mark on the text content corresponding to the time point in the second area.

6. The method for recording the video conference according to claim 1, wherein the text content presented in the second area has a playback function, and the method further comprises:
    playing the audio segment corresponding to the text content in response to the playback function being enabled.

7. A video conferencing system, comprising:
    a display device;
    a storage comprising an application program; and
    a processor coupled to the display device and the storage, and configured to execute the application program to start a video conference, and in response to the video conference being started, the processor being configured to:
    provide a user interface to the display device, wherein the user interface comprises a first area, a second area, and a timeline;
    in response to obtaining an image corresponding to each of a plurality of participants from a video signal through a person recognition algorithm, display the image of each of the participants in the first area;
    in response to converting an audio segment of one of the participants obtained from an audio signal into text content through a voice processing algorithm, associate the text content with the corresponding one of the participants, and display the text content in the second area based on an order of speaking; and
    adjust a time length of the timeline according to a recording time of the video conference,
    wherein the storage further comprises a person recognition module, a voiceprint recognition module, and a voice processing module, and the processor is configured to:
        identify each of the participants included in the video signal by executing the person recognition algorithm through the person recognition module, and obtain a relative position of each of the participants in a conference space;
        extract a voice from the audio signal through the voiceprint recognition module;
        determine a source position of the voice in the conference space by executing a sound source positioning algorithm through the voiceprint recognition module;

match the voice with the corresponding one of the participants based on the relative position and the source position; and convert the audio segment corresponding to the voice into the text content by executing the voice processing algorithm through the voice processing module.

8. The video conferencing system according to claim 7, wherein the first area provides an editing function, and the processor is configured to:

rename a name corresponding to the image through the editing function after displaying the image of each of the participants in the first area.

9. The video conferencing system according to claim 7, wherein the processor is configured to:

extract from the first area the image of one of the participants that matches the voice and a name corresponding thereto after converting the audio segment corresponding to the voice into the text content through the voice processing module; and display the name, the text content, and a reception time of the audio segment in the second area.

10. The video conferencing system according to claim 9, wherein the processor is configured to:

associate a time section corresponding to the audio segment on the timeline with the text content after converting the audio segment corresponding to the voice into the text content through the voice processing module.

11. The video conferencing system according to claim 7, wherein the user interface provides a marking function, and the processor is configured to:

based on a time point when the marking function is enabled, put a focus mark on the text content corresponding to the time point in the second area.

12. The video conferencing system according to claim 7, wherein the text content presented in the second area has a playback function, and the processor is configured to:

play the audio segment corresponding to the text content in response to the playback function being enabled.

* * * * *